United States Patent
Zhang

(10) Patent No.: US 12,542,755 B2
(45) Date of Patent: Feb. 3, 2026

(54) EMAIL-BASED VALUE TRANSFER METHOD AND VALUE TRANSFER CLUSTER SYSTEM

(71) Applicant: Shanghai Finmail Network Technology Co., Ltd., Shanghai (CN)

(72) Inventor: Haimin Zhang, Shanghai (CN)

(73) Assignee: Shanghai Finmail Network Technology Co., Ltd., Shanghai (CN)

( * ) Notice: Subject to any disclaimer, the term of this patent is extended or adjusted under 35 U.S.C. 154(b) by 0 days.

(21) Appl. No.: 18/011,186

(22) PCT Filed: Feb. 2, 2021

(86) PCT No.: PCT/CN2021/074894
§ 371 (c)(1),
(2) Date: Dec. 18, 2022

(87) PCT Pub. No.: WO2021/258737
PCT Pub. Date: Dec. 30, 2021

(65) Prior Publication Data
US 2023/0246992 A1    Aug. 3, 2023

(30) Foreign Application Priority Data

Jun. 24, 2020  (CN) .......................... 202010595116.X

(51) Int. Cl.
*H04L 51/56* (2022.01)
*G06Q 20/06* (2012.01)
(Continued)

(52) U.S. Cl.
CPC .......... *H04L 51/56* (2022.05); *G06Q 20/065* (2013.01); *G06Q 20/10* (2013.01); *H04L 51/48* (2022.05)

(58) Field of Classification Search
CPC ......... H04L 51/56; H04L 51/48; H04L 51/42; H04L 67/10; H04L 61/4511;
(Continued)

(56) References Cited

U.S. PATENT DOCUMENTS 6,039,250 A * 3/2000 Ito ........................ G06Q 20/02
235/375
7,499,875 B1 * 3/2009 May ...................... G06Q 40/04
705/40

(Continued)

FOREIGN PATENT DOCUMENTS

| CN | 104702645 A | 6/2015 |
| CN | 104956395 A | 9/2015 |
| CN | 111756619 A | 10/2020 |

OTHER PUBLICATIONS

International Search Report, issued in PCT/CN2021/074894, dated Apr. 21, 2021.
(Continued)

*Primary Examiner* — Michael Won
(74) *Attorney, Agent, or Firm* — Heslin Rothenberg Farley & Mesiti P.C.

(57) ABSTRACT

An email-based value transfer method and value transfer cluster system comprises the steps of: Establishing an IP connection of the e-mail interaction servers between a remitter and a remittee; Obtaining the payment receiving address of the remittee based on the interactive operations of the e-mail interaction servers; Performing the remittance operation according to the payment receiving address. The value transfer method provided by the present invention supports obtaining, registering and transferring value through e-mail interaction servers without the need of going through a unified interface server for digital/electronic currency services anymore. Using a unified interface address, or a digital/electronic address corresponding to the e-mail
(Continued)

address for payment receiving enables the remittance/remittance mail server bound to a domain name to realize value transfer safely, efficiently and economically through the e-mail address outside the system.

20 Claims, 11 Drawing Sheets

(51) Int. Cl.
*G06Q 20/10* (2012.01)
*H04L 51/48* (2022.01)

(58) Field of Classification Search
CPC .... G06Q 20/065; G06Q 20/10; G06Q 10/107; G06Q 20/30; G06Q 20/386
See application file for complete search history.

(56) References Cited

U.S. PATENT DOCUMENTS

| | | | | |
|---|---|---|---|---|
| 8,346,659 | B1* | 1/2013 | Mohsenzadeh | G06Q 20/00 705/37 |
| 8,396,926 | B1* | 3/2013 | Oliver | G06Q 10/107 709/206 |
| 8,443,185 | B2 | 5/2013 | Maller | |
| 8,606,703 | B1* | 12/2013 | Dorsey | G06Q 10/107 705/40 |
| 8,762,272 | B1* | 6/2014 | Cozens | G06Q 10/107 705/40 |
| 9,767,443 | B1* | 9/2017 | Wilson | G06Q 20/4012 |
| 9,767,458 | B2* | 9/2017 | Dorsey | G06Q 20/102 |
| 9,774,626 | B1* | 9/2017 | Himler | H04L 63/1483 |
| 10,078,821 | B2* | 9/2018 | Bouey | G06Q 20/10 |
| 10,235,378 | B1* | 3/2019 | Mamidi | G06F 16/164 |
| 10,423,990 | B2* | 9/2019 | Killoran, Jr. | G06Q 30/0279 |
| 10,574,600 | B1* | 2/2020 | Chiarella | H04L 51/214 |
| 12,141,770 | B2* | 11/2024 | Killoran, Jr. | G06Q 30/06 |
| 2001/0027523 | A1* | 10/2001 | Wakino | H04L 51/00 726/26 |
| 2001/0056395 | A1* | 12/2001 | Khan | G06Q 30/0226 705/14.27 |
| 2002/0198798 | A1* | 12/2002 | Ludwig | G06Q 30/04 705/35 |
| 2003/0069922 | A1* | 4/2003 | Arunachalam | H04L 41/5045 705/26.1 |
| 2005/0076220 | A1* | 4/2005 | Zhang | H04L 51/212 713/176 |
| 2005/0193069 | A1* | 9/2005 | Brown | G06Q 10/107 709/224 |
| 2006/0116957 | A1* | 6/2006 | May | G06Q 30/0601 705/40 |
| 2006/0123476 | A1* | 6/2006 | Yaghmour | H04L 63/0442 726/22 |
| 2006/0195379 | A1* | 8/2006 | Abecassis | G06Q 30/02 705/35 |
| 2008/0228651 | A1* | 9/2008 | Tapsell | G06Q 20/045 705/65 |
| 2009/0034701 | A1* | 2/2009 | Henry | H04N 1/32042 379/100.01 |
| 2010/0250947 | A1* | 9/2010 | Wong | H04L 51/212 713/175 |
| 2012/0191608 | A1* | 7/2012 | Myers | G06Q 30/02 709/206 |
| 2014/0279436 | A1* | 9/2014 | Dorsey | G06Q 20/10 705/39 |
| 2014/0279447 | A1* | 9/2014 | Dorsey | G06Q 20/023 705/39 |
| 2014/0337235 | A1* | 11/2014 | Van Heerden | G06Q 20/223 705/71 |
| 2015/0052055 | A1* | 2/2015 | Kassemi | G06Q 40/00 705/44 |
| 2015/0264627 | A1* | 9/2015 | Perdomo | H04W 40/12 370/329 |
| 2015/0310404 | A1* | 10/2015 | Dorsey | G06Q 20/023 705/42 |
| 2016/0125371 | A1* | 5/2016 | Grassadonia | G06Q 20/405 705/44 |
| 2016/0261531 | A1* | 9/2016 | Bronicki | H04L 51/212 |
| 2018/0295153 | A1* | 10/2018 | Eisen | H04L 63/1433 |
| 2019/0087811 | A1* | 3/2019 | McElmurry | G06Q 20/386 |
| 2019/0102756 | A1* | 4/2019 | Zhou | G06Q 20/3278 |
| 2019/0205862 | A1* | 7/2019 | Xu | G06Q 20/322 |
| 2020/0013037 | A1* | 1/2020 | Benkreira | G06Q 20/405 |
| 2020/0184370 | A1* | 6/2020 | Ben-Arie | G06F 18/2321 |
| 2021/0117940 | A1* | 4/2021 | Grassadonia | G06Q 20/384 |
| 2022/0261798 | A1* | 8/2022 | Wright | G06Q 20/065 |
| 2024/0232888 | A1* | 7/2024 | Mittal | G06Q 20/4015 |

OTHER PUBLICATIONS

Written Opinion, issued in PCT/CN2021/074894, dated Apr. 21, 2021.

* cited by examiner

EMAIL-BASED VALUE TRANSFER METHOD AND VALUE TRANSFER CLUSTER SYSTEM

BACKGROUND OF THE INVENTION

Field of the Invention

The present invention relates to the technical field of value transfer, in particular, to an email-based value transfer method and value transfer cluster system.

Description of the Prior Art

With the popularization of the Internet, e-mail has become a widely used communication tool and is particularly important in business communication. As a kind of text file information, its content also has a high legal effect. However, due to the lack of cross-platform value transmission capabilities, the conventional e-mail system can only become an information carrier and cannot undertake financial responsibilities, thus greatly restricting its scope of application. Meanwhile, although banks or third-party payments have assumed the main responsibility of value transmission, their information transmission capabilities are very weak, and their business models are quite different from e-mail systems. They are basically two completely different forms.

On the other hand, the current development direction of blockchain and digital currency (such as bitcoin, etc.) mainly refers to bank or third-party payment, but it is difficult to obtain similar transmission efficiency and legal protection, which lacks practical application foundation and cannot truly reflect the value of blockchain and digital currency. At the same time, anonymity also makes it difficult for digital currencies to obtain necessary legal support and supervision.

Meanwhile, there are natural similarities between e-mail and digital currency (such as anonymity, accessible cross-platform transmission, low transmission cost and irreversibility, etc.). In the Prior Art 1, application number CN201910217445.8, the name of the invention is "VALUE TRANSFER SYSTEM BASED ON THE DOMAIN NAME SYSTEM (DNS), METHOD THEREOF AND DNS SERVER". In the Prior Art 2, application number CN201910092306.7, the name of the invention is "CURRENCY-PROTOCOL CONVERGED E-MAIL SYSTEM, AND E-MAIL SENDING AND RECEIVING METHODS THEREFOR". Both the Prior Art 1 and the Prior Art 2 have realized sending/receiving electronic currency synchronously with e-mail. However, neither the Prior Art 1 nor the Prior Art 2 fully utilizes the IP address and the interaction capability of the e-mail server itself, thus causing a waste of resources in some scenarios.

SUMMARY OF THE INVENTION

Aiming at the defects of sending/receiving digital and/or electronic currency by e-mail, the present application provides an email-based value transfer method and value transfer cluster system.

The technical scheme of the present invention is as follows:

The present invention provides an email-based value transfer method, comprising the steps of:
 Establishing an IP connection of the e-mail interaction servers between a remitter and a remittee;
 Obtaining the payment receiving address of the remittee based on the interactive operations of the e-mail interaction servers;
 Performing the remittance operation according to the payment receiving address.

Further preferably, obtaining the payment receiving address of the remittee based on the interactive operations of the e-mail interaction servers specifically comprising: Based on the fund inquiry function configured in the e-mail interaction server, querying the payment receiving address corresponding to the remittee's e-mail address, or querying the payment receiving address corresponding to the remittee's e-mail domain name configured in the DNS server.

Further preferably, obtaining the payment receiving address of the remittee based on the interactive operations of the e-mail interaction servers specifically comprising: Based on the SMTP protocol supporting remittance instructions configured in the e-mail interaction servers, querying the payment receiving address.

Further preferably, the payment receiving address is a unified interface address or a digital/electronic currency corresponding to the target e-mail address.

Further preferably, if the payment receiving address is a unified interface address, the remittance operation further comprises sending remittance information to the remittee.

The present invention also provides an email-based value transfer cluster system, comprising: e-mail client, several remittance mail management server clusters, each remittance mail management server cluster is configured with corresponding e-mail interaction servers respectively;

The remittance mail management server clusters are interactively connected to the e-mail client and corresponding e-mail interaction servers respectively; The remittance mail management server is used to receive e-mail sending request information from the e-mail client and, when the e-mail sending request information contains remittance information, the remittance mail management server further sends the remittance information to the e-mail interaction server;

The e-mail interaction server is used to send/receive e-mails and, is also used to obtain payment receiving address according to the remittance information and, feedback the payment receiving address to the remittance mail management server cluster;

The remittance mail management server cluster is further configured to perform remittance operations according to the payment receiving address.

Further preferably, the e-mail interaction server is provided with a fund inquiry module, and the fund inquiry module is used to query the payment receiving address corresponding to the remittee's e-mail address, or to query the payment receiving address corresponding to the remittee's e-mail domain name configured in the DNS server.

Further preferably, the e-mail interaction server queries the payment receiving address based on the configured SMTP protocol supporting remittance instructions.

Further preferably, the payment receiving address is a unified interface address or a digital/electronic currency address corresponding to the target e-mail address.

Further preferably, each remittance mail management server cluster is configured with e-mail domain names, so that the remittance mail management server cluster performs remittance operations according to the e-mail domain names.

The email-based value transfer method and value transfer cluster system provided by the present invention has the following effects:

1. It supports obtaining, registering and transferring value through e-mail interaction server without the need of going through unified interface server for digital/electronic currency services anymore.
2. Using a unified interface address, or a digital/electronic address corresponding to the e-mail address for payment receiving enables the remittance/remittance mail server bound to a domain name to realize value transfer safely, efficiently and economically through the e-mail address outside the system.
3. In addition to the unified interface protocol, value transfer can also be achieved by simply extending the existing SMTP protocol without the need for additional protocols.
4. By combining the cluster system architecture, it enables users to add or remove multiple domain names and e-mail addresses flexibly and, it is suitable for various users including small and medium-sized companies, cloud service providers, enterprises and individuals, etc.

DESCRIPTION OF THE PREFERRED EMBODIMENTS

The present invention will be further explained in detail in combination with the drawings and specific implementation below.

Terms used in the present application are defined as below:
Digital/Crypto currency: decentralized digital currency, generally generated through "mining" work, such as bitcoin and litecoin, etc., hereinafter referred to as "digital currency". Its scope also includes tokens that rely on such network to circulate, such USDT stable coins, etc.
Electronic currency: electronic conventional/legal currency or tokens and virtualized electronic currency of related payment services, such as PayPal and Alipay, and their virtualized electronic currencies, etc.
Regular mail: ordinary e-mail.
Remittance mail: an e-mail with remittance identifier, such as "Pay-To", i.e., Pay To, is sent while the remittance is synchronically performed.
Fund management server: transfer values using network protocols, wherein both remittee and remitter can be settled independently based on the fund management server.
DNS server: Domain Name System.

Based on the natural similarities between e-mail and digital currency, such as anonymity, accessible cross-platform transmission, low transmission cost and irreversibility, etc., the e-mail interaction server is applied for realizing that, in addition to the conventional e-mail receiving/sending functions, it also undertakes the functions that are similar to the unified interface interaction server for digital/electronic currency services. Based on the e-mail interaction server, it completes the functions such as inquiry and registration of payment receiving address, etc.

Embodiment One

Figure 1:
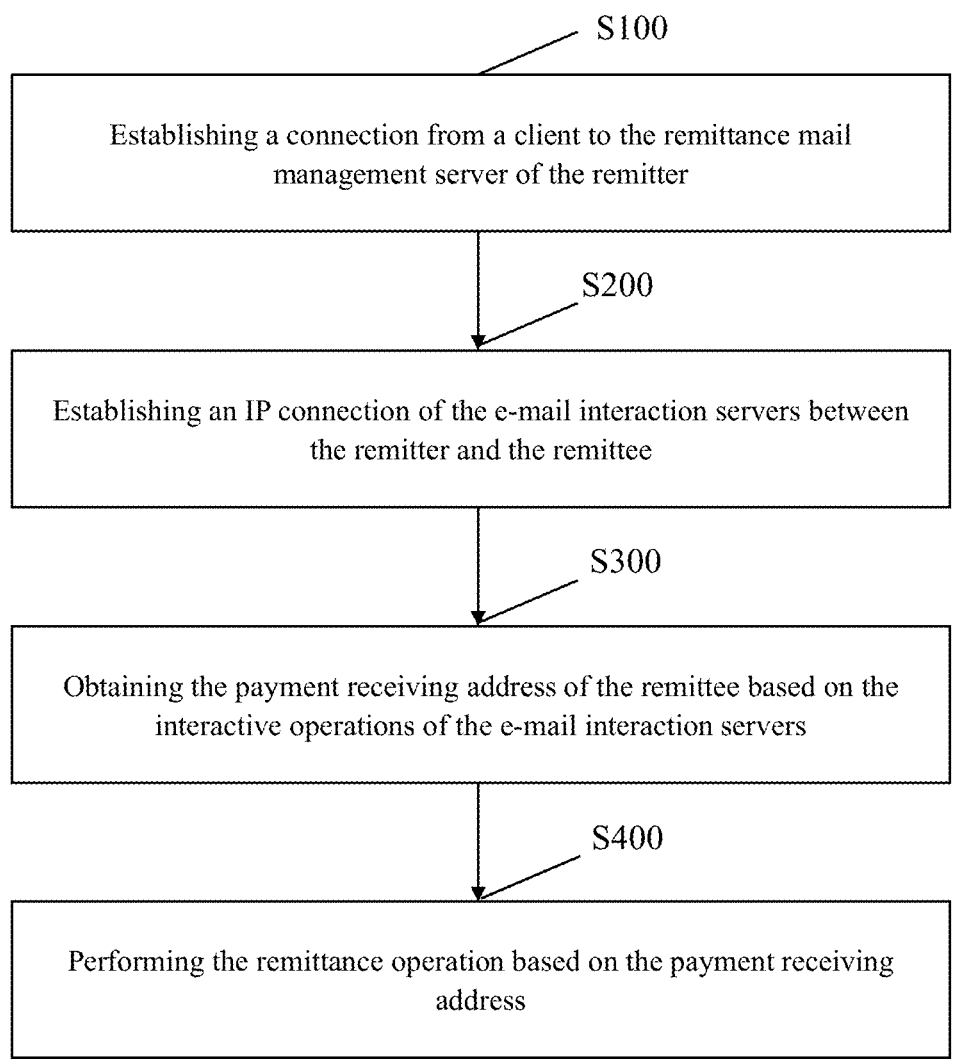
FIG. 1 is a flow-chart of email-based value transfer method

This embodiment provides an email-based value transfer method, the flow-chart of which is shown in FIG. 1, specifically including the following steps.
S100: Establishing a connection from a client to the remittance mail management server of the remitter.
S200: Establishing an IP connection of the e-mail interaction servers between the remitter and the remittee.
S300: Obtaining the payment receiving address of the remittee based on the interactive operations of the e-mail interaction servers
S400: Performing the remittance operation according to the payment receiving address.

The above steps are described in detail below.

Figure 2:
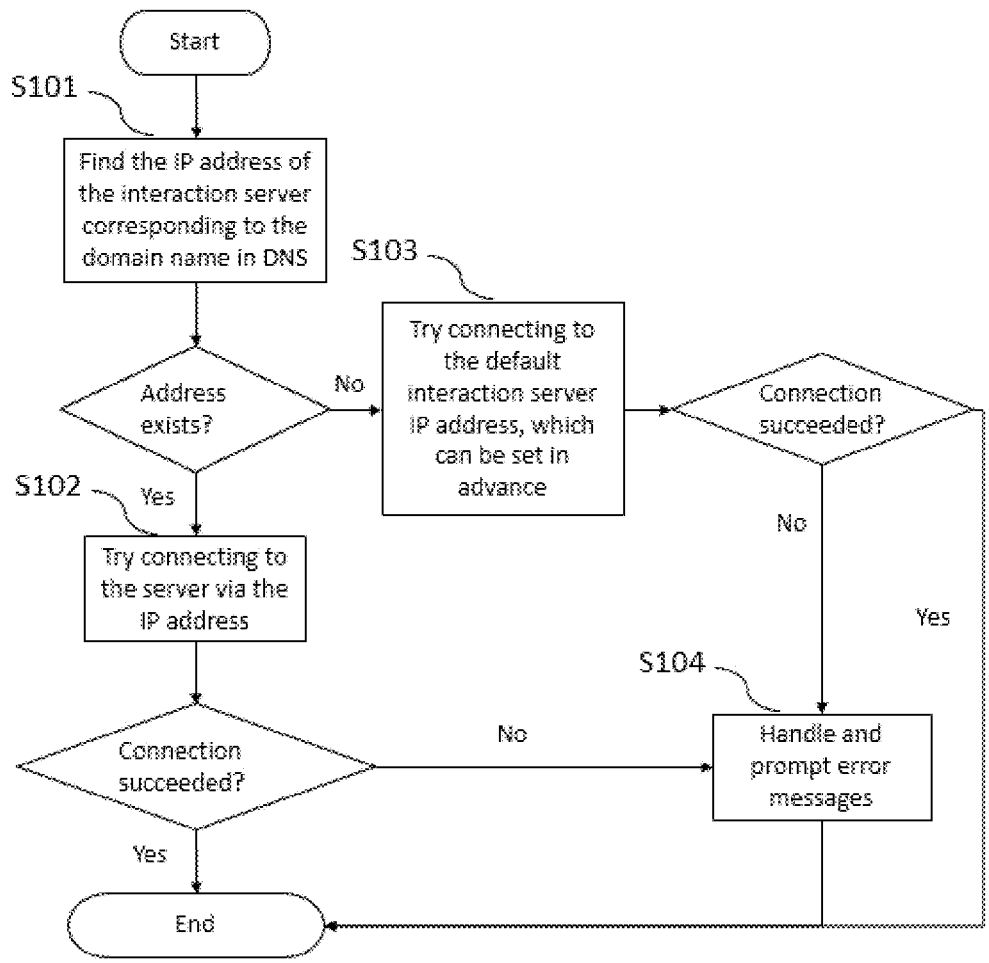
FIG. 2 is a flow-chart of client's connecting to remittance (mail) server

Before establishing an IP connection of the e-mail interaction servers between a remitter and a remittee, it also includes step S100, namely establishing a connection from a client to the remittance mail management server of the remitter. In Step S100, as shown in FIG. 2, a client can query the IP of corresponding remittance mail management server or remittance management server through MX or other records in DNS according to the domain name of the user/remitter/sender's e-mail address. If there is a corresponding IP, the client can try connecting to the IP. If the connection is successful, relevant operations will be performed through the e-mail interaction server. If the connection fails, it will prompt the user about the situation and can try connecting to a default server. If there is no corresponding IP, it may also try connecting to a default server.

Unlike domain-name-related remittance/remittance mail management server, a default server may accept all domain-name addresses as a temporary supplement. If some domain names point to a specific remittance/remittance mail management server in the future, the relevant domain addresses in the default server can be transferred to the new remittance/remittance mail management server.

In step S200, referring to the Prior Art 1, the IP address of the e-mail interaction server corresponding to the domain name in the DNS is searched, and then an IP connection of the e-mail interaction servers between the remitter and the remittee is established. It should be noted here that, step S200 may more generally refer to establishing an IP connection of the e-mail interaction servers between the sender and the recipient, because as long as the e-mail is sent and received, it is necessary to establish an IP connection of the e-mail interaction servers between the two parties.

In step S300, the payment receiving address of the remittee is obtained based on the interactive operations of the e-mail interaction servers. Specifically, the payment receiving address may be obtained in the following ways.

Figure 3:
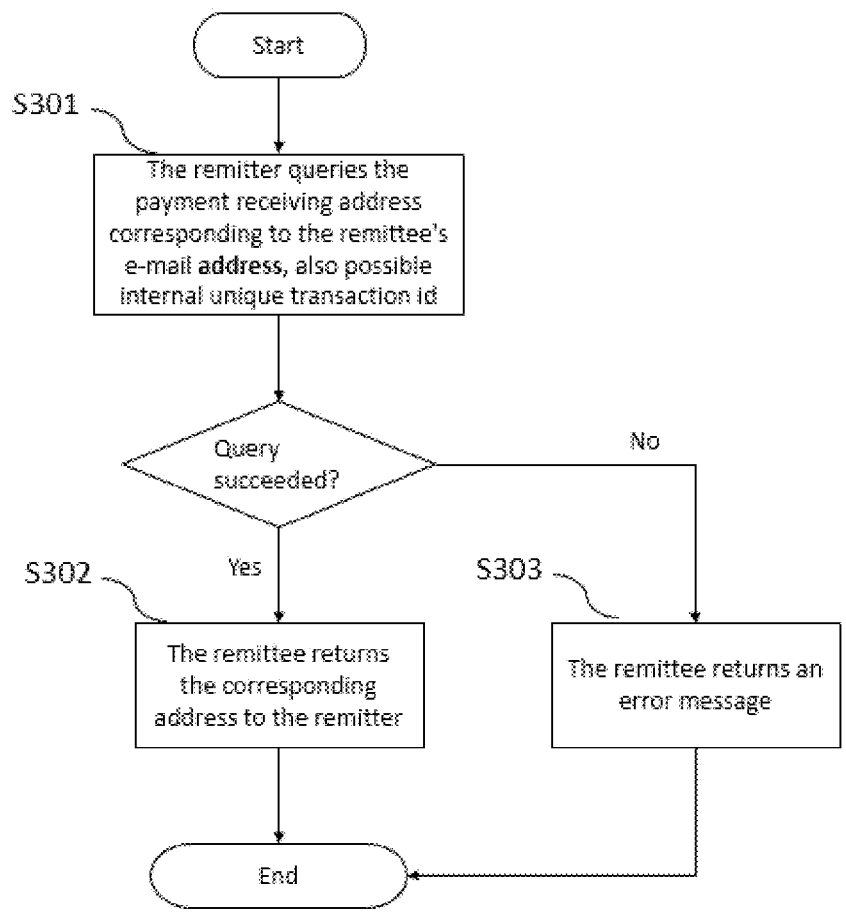
FIG. 3 is a flow-chart of querying and connecting to an e-mail interaction server IP

The first acquisition method: obtaining the payment receiving address through the interaction server, as shown in FIG. 3, specifically, the remitter inquires the payment receiving address corresponding to the remittee's e-mail address and possible internal unique transaction id to obtain the payment receiving address.

For example, to the remittance mail system, a query module similar to the unified interface interaction server for digital/electronic currency services is added to the e-mail interaction server, so that the remittee and the remitter can get the payment receiving address of digital/electronic currency by interactions of the e-mail interaction servers running this module. Since the IP address of the e-mail interaction server can be obtained through the MX field in the DNS server, there is no need to query other records such as CX, etc.

Figure 4:
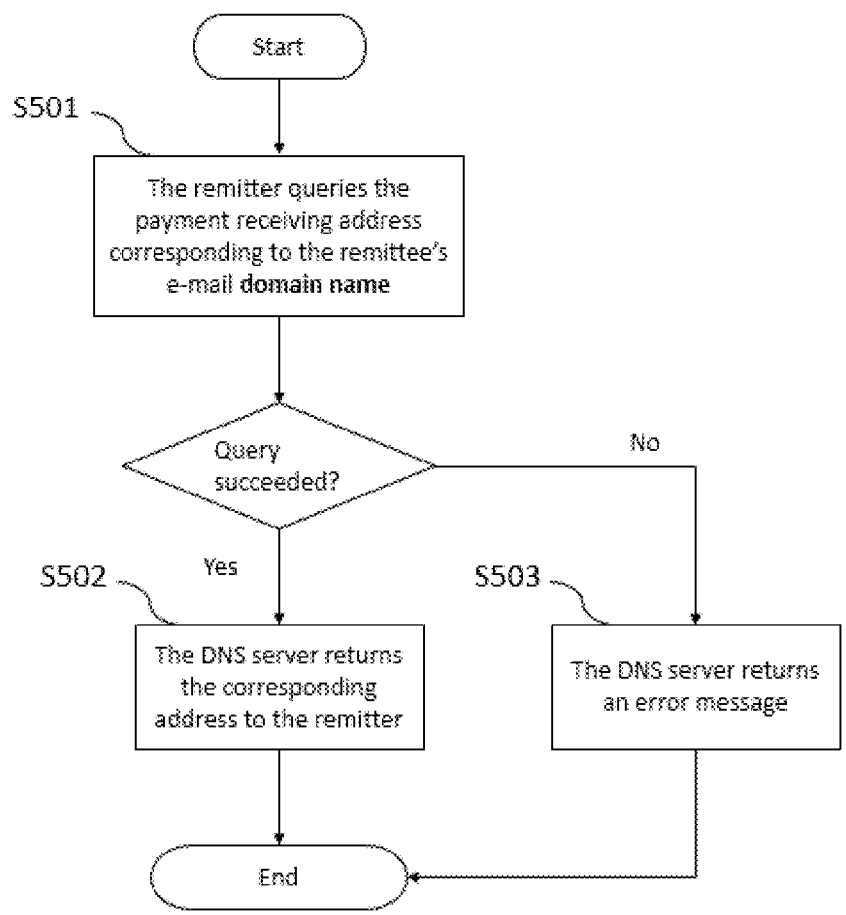
FIG. 4 is a flow-chart of another method of querying and connecting to an e-mail interaction server IP

The second acquisition method: obtaining the payment receiving address through the DNS server, as shown in FIG. 4, specifically, the remitter queries the payment receiving address corresponding to the remittee's e-mail domain name in the DNS server to obtain the payment receiving address returned by the DNS server. It should be further noted that when the payment receiving address is obtained through the DNS server, it is not necessary to establish an IP connection of the e-mail interaction servers between the remitter and the remittee, while the relevant records are configured with corresponding payment receiving address in the DNS server.

For example, to remittance mail or independent remittance system, if the payment receiving address is a unified payment receiving address of digital/electronic currency, a new record can be added to the e-mail domain name in DNS, for example, under the domain name of "mail.abcd.com", adding a record of "TXT" type, the content of which can be a unified payment receiving address of digital/electronic currency, such as "1A2B3C". After the remitter's obtaining the address, it can first generate a possible transaction code for remittance to that address, and inform the remittee of relevant information, such as transaction id, etc., by sending an e-mail or server interactions. Then the actual remittance can be made to that address. If the transaction id cannot be obtained in advance, preferably, the actual remittance can be made after informing the remittee of the information. This method needs to ensure the security of the communications with the DNS server, so that the payment receiving address is not tampered with. For this purpose, protocols such as DNSSEC, etc. can be used.

Figure 5:
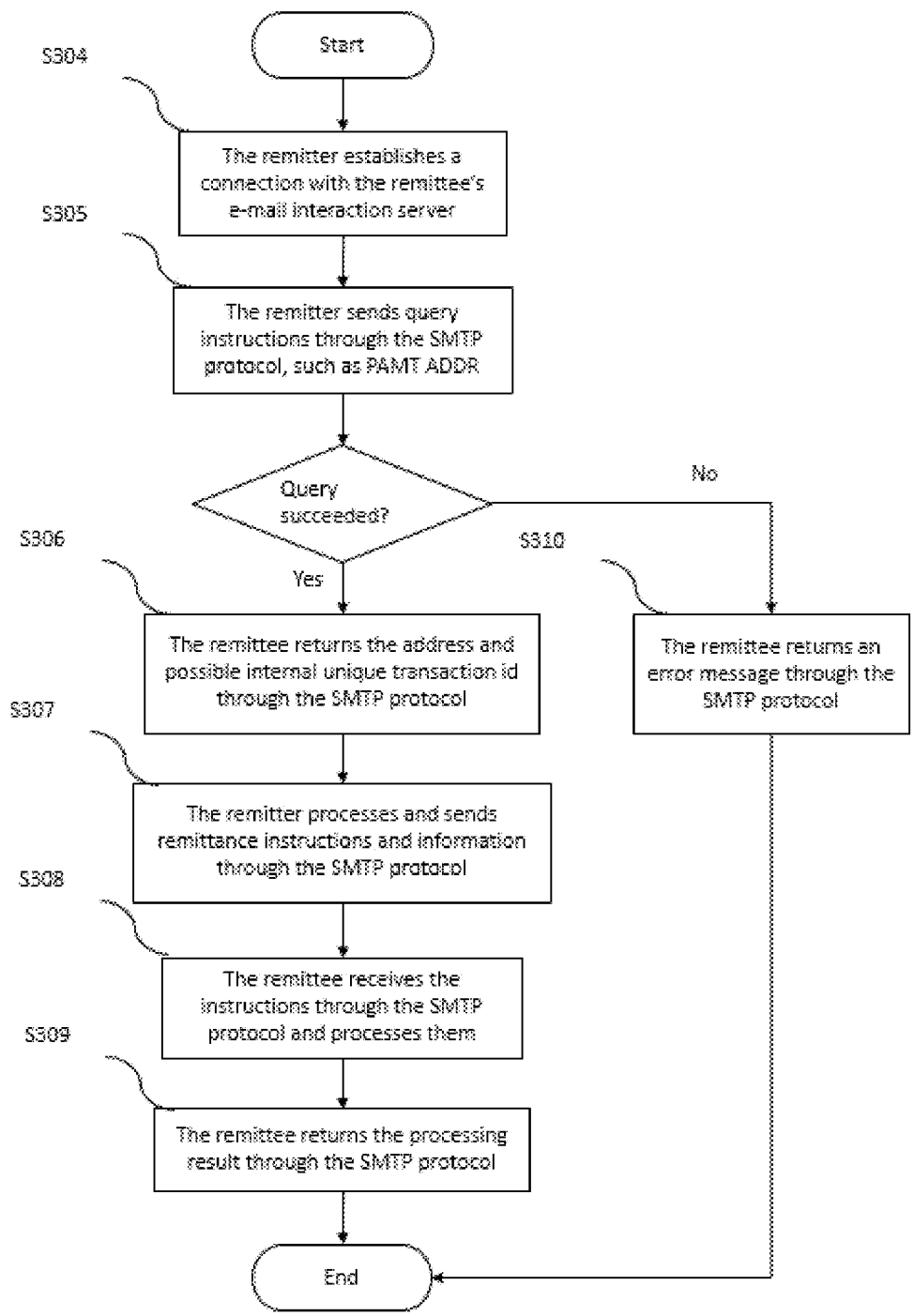
FIG. 5 is a flow-chart of remittance based on the SMTP protocol

The third acquisition method: obtaining the payment receiving address through the SMTP protocol. Specifically, the remitter sends a query instruction through the SMTP protocol, and the remittee returns the payment receiving address and the internal unique transaction id through the SMTP protocol, to obtain the payment address. The flowchart of realizing value transfer based on the SMTP protocol is shown in FIG. 5.

Among them, the specific implementation of the third acquisition method is:

To the remittance mail system, referring to RFC5321 and extending the existing SMTP command set, adding new commands to obtain the payment receiving address of the recipient's digital/electronic currency and other information. For example, "PAMT ADDR" (i.e. "Payment Address") and/or "PAMT TO" (i.e. "Payment To"), the format can be:

PAMT ADDR: <Remittee's Address> <Unit> [Service Provider Identifier (Optional)]
250 Ok: <Payment Receiving Address of Electronic/ Digital Currency>
PAMT TO: <Remittee's Address> <Amount> <Unit> <Transaction ID> [Service Provider Identifier (Optional)]
250 Ok An example of interaction is as follows:
Client query instruction: PAMT ADDR: <abcd1234@abcd.com> BTC
Server response: 250 Ok: 1A1zP1eP5QGefi2DMPTfTL5SLmv7DivfNa
Client remittance instruction: PAMT TO:<abcd1234@abcd.com> 50 BTC 4a5e1e4baab89f3a32518a88c31bc87f618f76673e2cc77ab2127b7afdeda33b
Server response: 250 Ok The "PAMT TO" instruction can be submitted to the server before or after the transaction actually occurs. However, preferably, it should be submitted to the server after the transaction id has been generated but before the transaction actually occurs, especially for digital currency remittance, so as not to be preemptively declared by other users and cause the remittance to be wrongly transferred to other e-mail addresses. For example, to bitcoin remittance, if it is submitted to the e-mail server of the remittee after the actual transaction broadcast occurs, other users can preemptively obtain the public transaction id and preemptively register the payment to another e-mail address through a similar PAMT TO instruction, resulting in losses.

On the other hand, the "PAMT TO" instruction can also be omitted, and the relevant information can be placed in the header of the e-mail instead, referring to the Prior Art 2.

Further, to the sample of extended SMTP, verification can also be completed by means of a special string or public/ private key signature, etc., for example:

PAMT ADDR: <Remittee's Address> <Unit> [Service Provider Identifier (Optional)];
250 Ok: <Payment Receiving Address of Electronic/ Digital Currency> <The Unique Internal Transaction Identifier String Corresponding to the New Transaction>;
PAMT TO: <Remittee's Address> <Amount> <Unit> <Transaction ID> <The Unique Internal Transaction Identifier String> [Service Provider Identifier (Optional)];
250 Ok;

An example of interactions is as follows:
Client query instruction: PAMT ADDR: <abcd1234@abcd.com> BTC;
Server response: 250 Ok: 1A1zP1eP5QGefi2DMPTfTL5SLmv7DivfNa23rj89wpgjas8e;
Client remittance instruction: PAMT TO: <abcd1234@abcd.com> 50 BTC 4a5e1e4baab89af3a32518a88c31bc87f618f76673e2cc77ab2127b7afdeda33b 23rj89wpgjas8e;
Server response: 250 Ok.

The above-mentioned unique internal transaction identification string can be randomly generated and recorded at each query. In this case, since the internal transaction identification string is unique and known only to the inquirer/responder, client instructions can be submitted to the server at any time, even if the actual transaction has been carried out, without worrying about being preemptively declared by other users.

Figure 6:
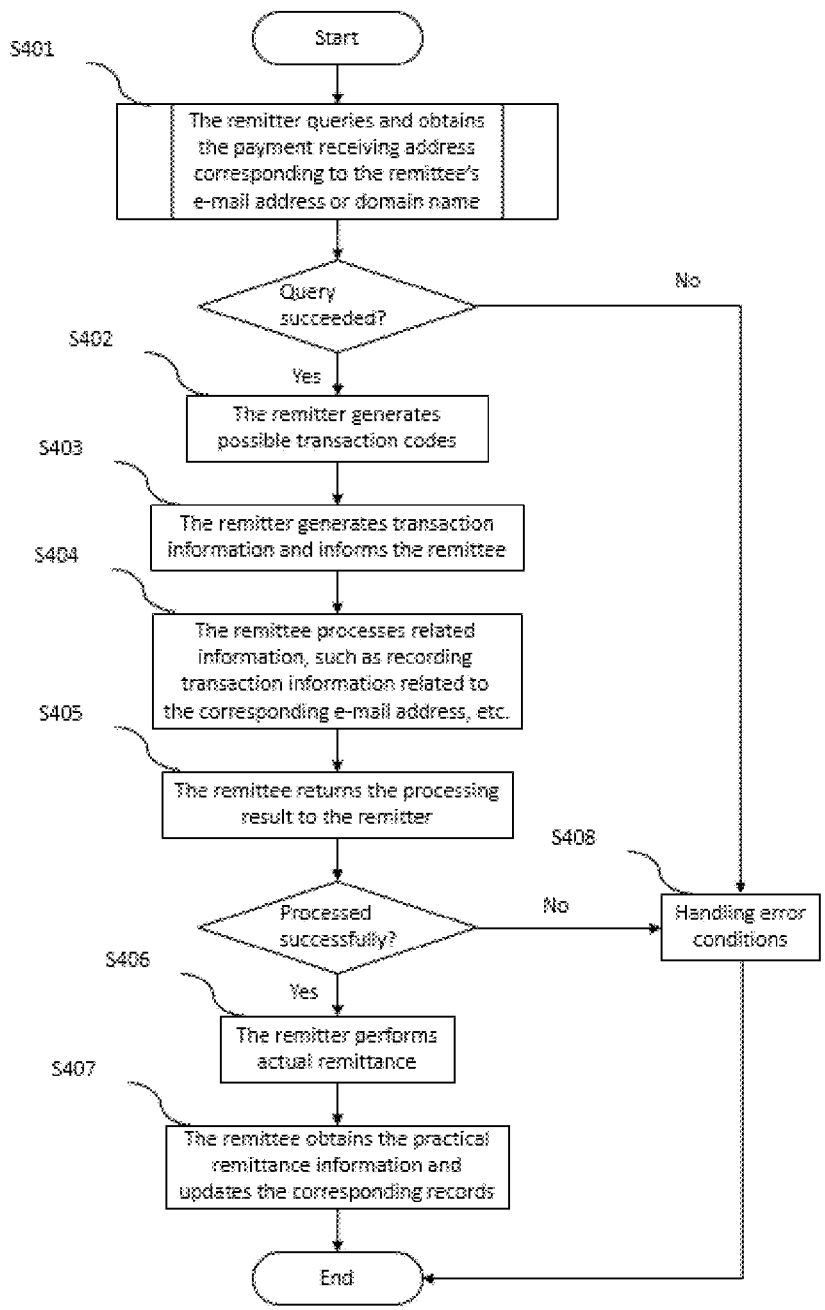
FIG. 6 is a basic flow-chart of remittance

In step S400, the remittance operation is performed according to the payment receiving address. The specific remittance operations are as follows, and the basic flow of the remittance is shown in FIG. 6:

1) The fund interaction server of the remitter queries the IP of the fund interaction server of the remittee through DNS and, interacts with it to obtain the payment receiving address. The payment receiving address can be either a unified interface address or a digital/electronic currency address corresponding to the target e-mail address.
2) If the recipient address is a unified interface address, the remitter needs to additionally inform the fund interaction server of the remittee of the corresponding remittance information, so that the remittee can correctly dispatch internally. For example, if it is a bitcoin remittance, the remitter can first generate transaction instruction codes and obtain the transaction id, and then inform the fund interaction server of the remittee of the corresponding information, such as the transaction id and the corresponding e-mail address for payment receiving, and finally broadcast to perform the actual remittance. If the transaction id cannot be obtained in advance, preferably, the actual remittance can be made after informing the remittee of the information. After receiving the transaction information provided by the remitter, the fund interaction server of the remittee sends it to the fund management server, and the latter one records it. When the fund interaction/management server of the remittee obtains the actual payment and transaction id from the digital/electronic currency network, it can compare the relevant records and update the corresponding payment receiving account, thereby completing the payment receiving.
3) If the payment receiving address is a digital/electronic currency address corresponding to the target e-mail address, the remitter usually does not need to inform the fund interaction server of the remittee of additional information, but only needs to perform remittance. The remittee obtains the actual payment and transaction information from the digital/electronic currency network and, retrieves the corresponding payment receiving account according to different addresses, thereby updating it to complete the payment receiving. In some cases, the remitter may also provide additional information to the fund interaction server of the remittee, such as the remitter's e-mail address, etc. To digital currency remittance, for the sake of security, different digital currency addresses can be used for the same target e-mail address for each remittance.

Preferably, a unified interface address is used as payment receiving address. Adopting this method has the following advantages: 1. Since all payment receiving accounts use the same payment receiving address, the remittee's data can be protected and prevented from being leaked. For example, to bitcoin remittance, if an e-mail address corresponds to a digital/electronic currency address, a user may obtain the corresponding digital/electronic currency address by remitting to a certain e-mail address and, get other information of the remittee through a block explorer according to the address, such as the accumulative amount received and the count number of remittances, etc. If the address is not replaced in the future, all payment receiving records of the remittee will be publicly available, resulting in the leakage of the remittee's economic information; 2. Additional information can be used to ensure the reliability of the remittance process. By providing information such as amount, remitter's e-mail address, transaction id, etc., the identity and transaction records of the remitter can be ensured to be authentic and reliable and, it can prevent others from impersonating.

Further, after obtaining the relevant transaction information, the remittee can record the relevant information into a database, such as the e-mail address and the corresponding transaction id and amount. After the remittee obtains the actual remittance information from the digital/electronic currency network through regular scanning or RPC calling, etc., it updates the relevant records associated with the e-mail address according to the corresponding information registered before, such as increasing or decreasing corresponding balance, etc. So far, a remittance is completed.

The value transfer method provided by this embodiment has the ability to support obtaining, registering and transferring value through e-mail interaction server, and does not need to use a unified interface server for digital/electronic currency services anymore. Using a unified interface address, or a digital/electronic currency address corresponding to the e-mail address for payment receiving enables the remittance/remittance mail server bound to the domain name to safely, efficiently and economically realize value transfer through the e-mail address outside the system.

Embodiment Two

Based on Embodiment One, this embodiment provides an email-based value transfer cluster system.

The value transfer cluster system provided in this embodiment may be an independent remittance cluster system, or a cross-platform remittance mail cluster system. This embodiment takes the cross-platform remittance mail cluster system as an example for description. On the basis of cross-platform remittance mail cluster system, those skilled in the art can obtain an independent remittance cluster system through transformation.

Because the cross-platform remittance mail cluster system is to cluster some servers in the cross-platform remittance mail system, before introducing the cross-platform remittance mail cluster system, the cross-platform remittance mail system will be introduced first.

Figure 7:
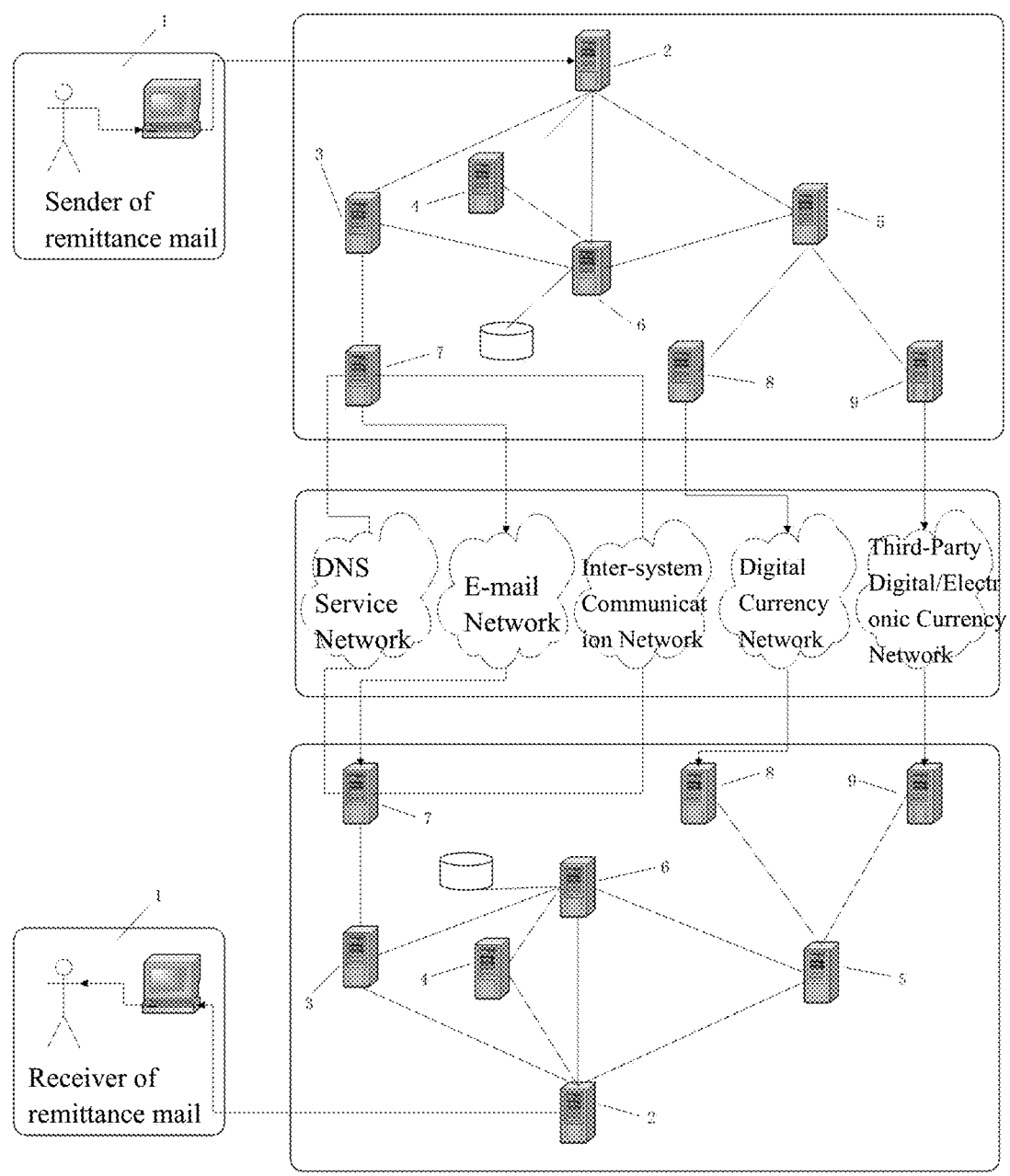
FIG. 7 is a value transfer architecture diagram, where the e-mail interaction server has the function of inquiring the payment receiving address

The improved cross-platform remittance mail system is shown in FIG. 7, including an e-mail client 1, a remittance mail management server 2, an e-mail management server 3, a user authentication server 4, a fund management server 5, a database server 6, an e-mail interaction server 7, a digital currency interaction server 8 and a third-party digital/electronic currency interaction server 9. The e-mail interaction server 7 is provided with a fund query module, and the fund query module is used to query the payment receiving address corresponding to the remittee's e-mail address or the payment receiving address corresponding to the remittee's e-mail domain name configured in the DNS server; In addition to the conventional e-mail sending/receiving functions, the e-mail interaction server 7 also undertakes functions similar to the unified interface interaction server for digital/electronic currency services.

Figure 8:
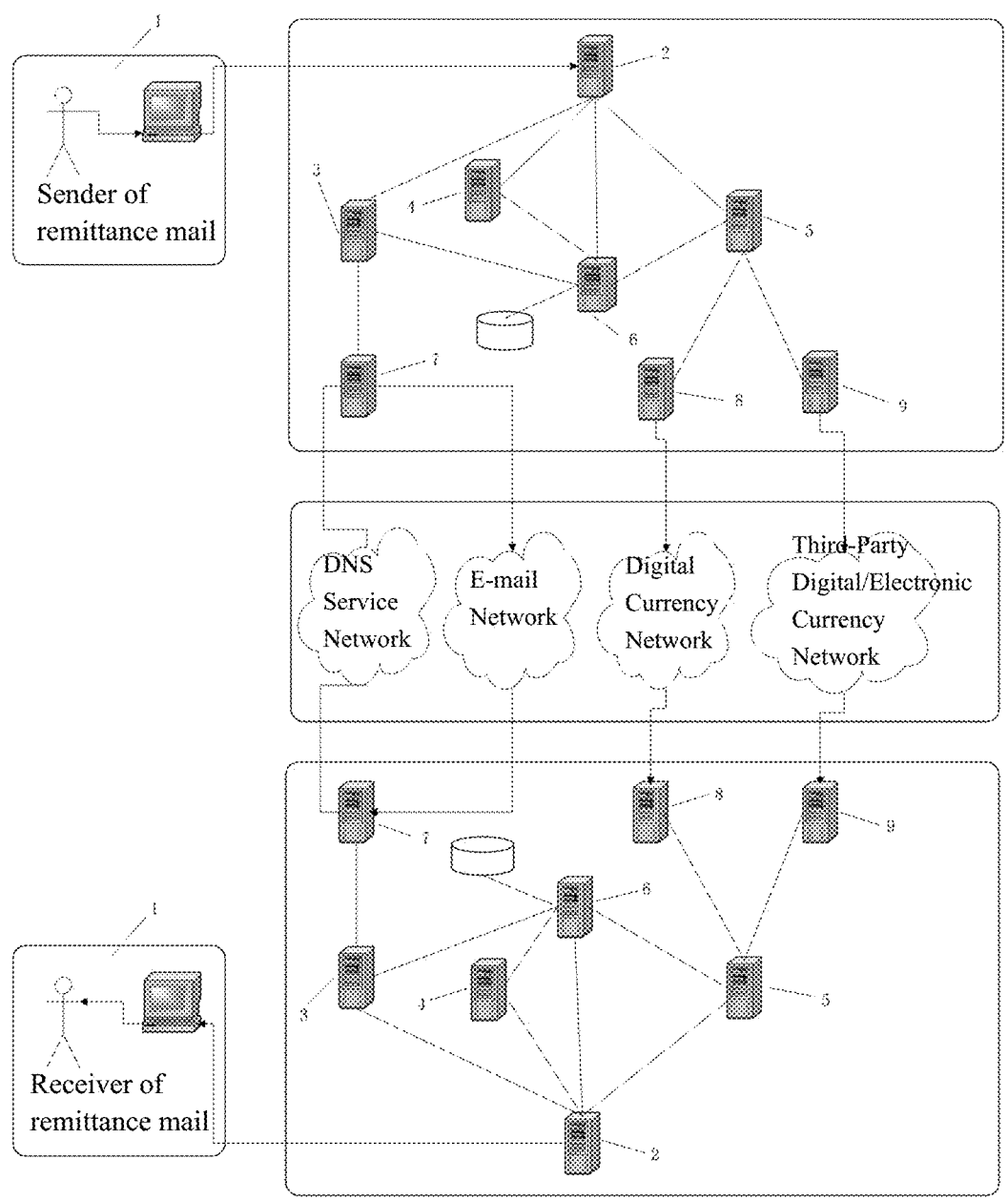
FIG. 8 is a value transfer architecture diagram for inquiring the payment receiving address based on the SMTP protocol

Another improved cross-platform remittance mail system is shown in FIG. 8, the structure of this cross-platform remittance mail system is the same as the structure of the cross-platform remittance mail system in FIG. 7, the difference is that the e-mail interaction server 7 in this cross-platform remittance mail system is configured with the SMTP protocol that supports remittance instructions, so that the e-mail interaction server 7 in this cross-platform remittance mail system queries the payment receiving address based on the configured SMTP protocol that supports the remittance instructions; In addition to the conventional e-mail receiving/sending functions, the extended SMTP commands that support remittance are also used to complete functions such as inquiry and registration of the payment receiving address, etc.

The value transfer cluster system (that is, the cross-platform remittance mail cluster system) provided in this embodiment includes an e-mail client 1, a database server 6, a digital currency interaction server 8, a third-party digital/electronic currency interaction server 9, several remittance mail management server clusters 10 and, each remittance mail management server cluster is configured with a corresponding e-mail interaction server 7 respectively.

Wherein, the remittance mail management server cluster 10 is connected with the e-mail client 1 and the corresponding e-mail interaction server 7 respectively; the remittance mail management server cluster 10 is used to receive the e-mail sending request information sent by the e-mail client, and when the e-mail sending request information contains remittance information, the remittance mail management server cluster 10 is also used to send the remittance information to the e-mail interaction server 7; the e-mail interaction server 7 is used for sending and receiving e-mails, and is also used to obtain the payment receiving address according to the remittance information and, feed the payment receiving address back to the remittance mail management server cluster 10; the remittance mail management server cluster 10 is further configured to perform remittance operations according to the payment receiving address.

Corresponding to the two different cross-platform remittance mail systems provided above, this embodiment provides corresponding two different cross-platform remittance mail cluster systems.

Figure 9:
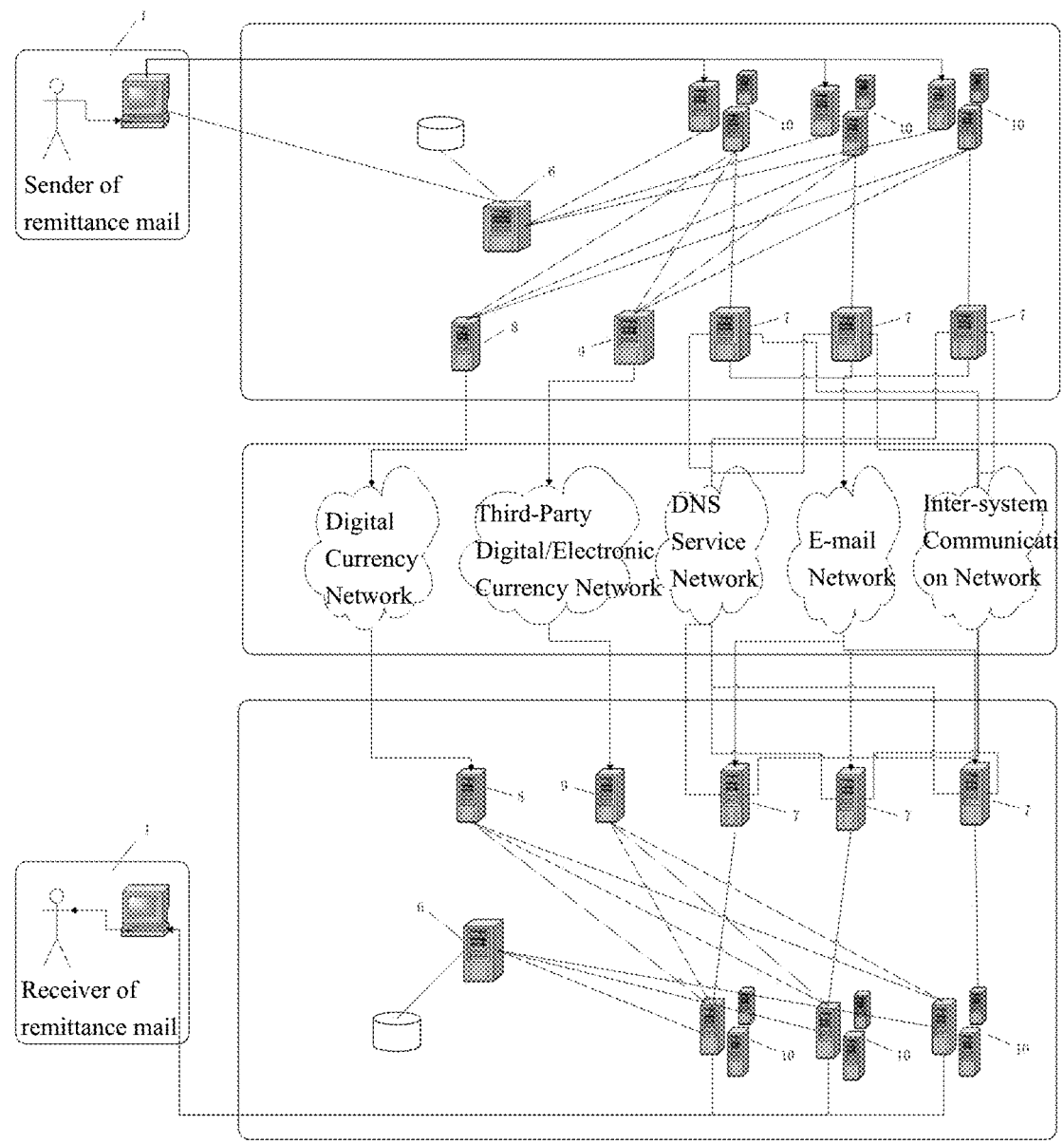
FIG. 9 is a schematic diagram of the cluster system in FIG. 7
Figure 10:
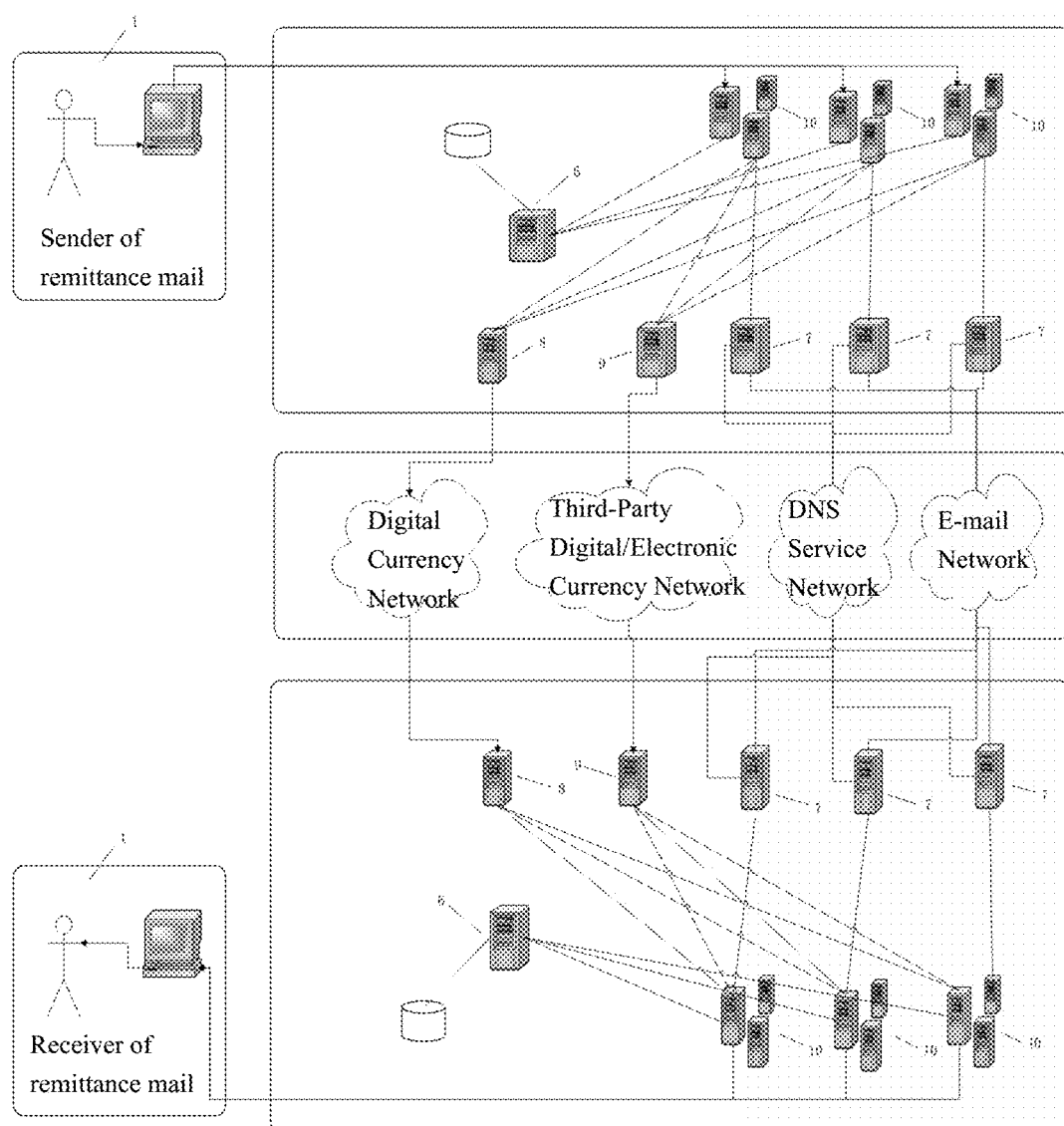
FIG. 10 is a schematic diagram of the cluster system in FIG. 8

Corresponding to FIG. 7, the cross-platform remittance mail cluster system provided by this embodiment is shown in FIG. 9, and corresponding to FIG. 8, another cross-platform remittance mail cluster system provided by this embodiment is shown in FIG. 10. Wherein, the remittance mail management server cluster 10 in FIG. 9 and FIG. 10 includes a remittance management server, a user authentication server, an e-mail management server and a fund management server. For example, three remittance mail management server clusters 10 can be set, namely, remittance mail management server cluster A, remittance mail management server cluster B, and remittance mail management server cluster C, and the corresponding e-mail domain name is configured for each remittance mail management server cluster. For example, the e-mail domain name configured for remittance mail management server cluster A is @mail1.com, the e-mail domain name configured for remittance mail management server cluster B is @mail2.com, and the e-mail domain name configured for remittance mail management server cluster C is @mail3.com.

The configuration of one domain name for each of the above-mentioned remittance mail management server clusters is only an implementation manner. In other embodiments, according to practical needs, each remittance mail management server cluster may be configured with different numbers of domain names.

Figure 11:
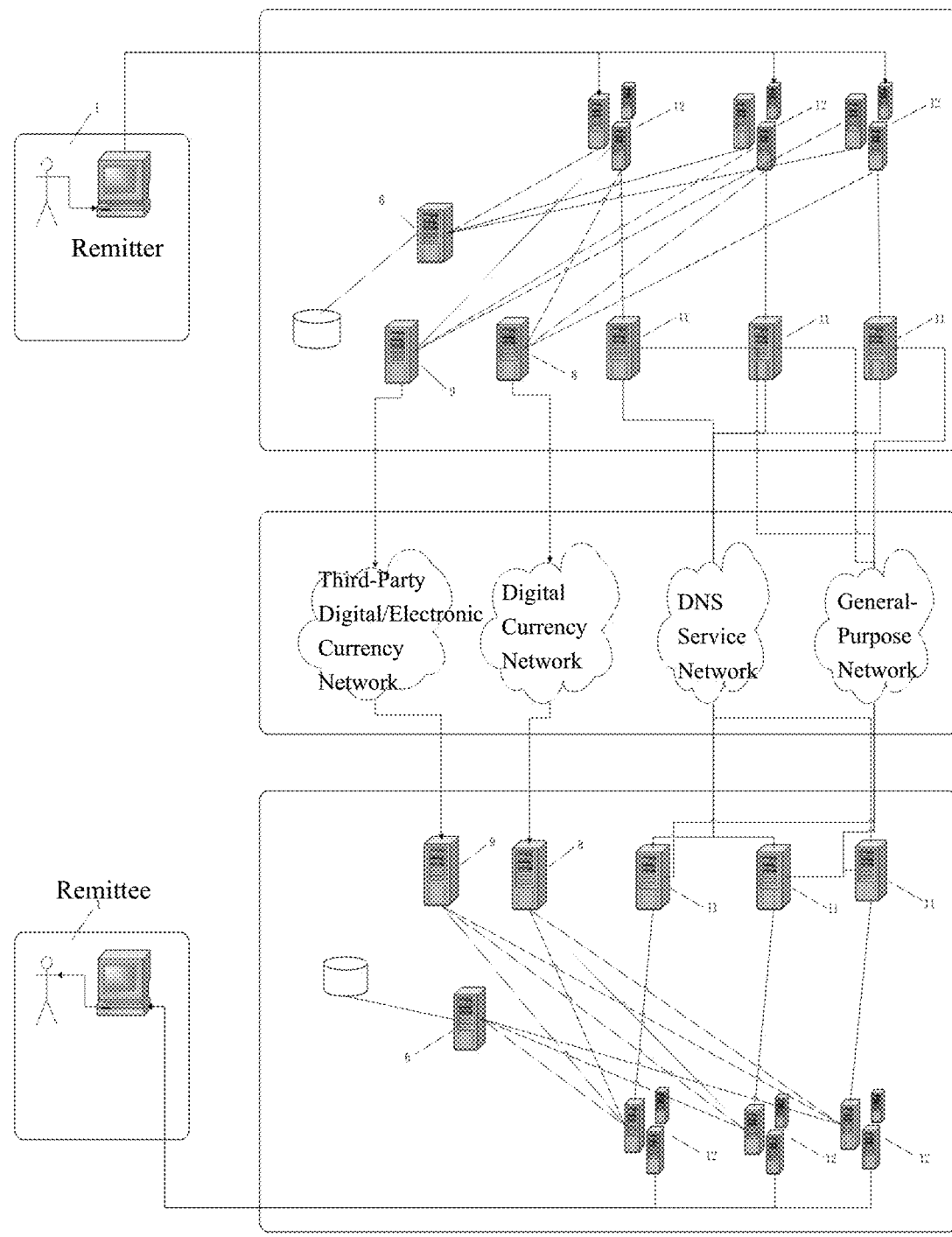
FIG. 11 is a schematic diagram of an independent remittance cluster system

In other embodiments, those skilled in the art can transform the cross-platform remittance mail cluster system provided above to realize an independent remittance cluster system, for example, replace the e-mail interaction server 7 in the above-mentioned cross-platform remittance mail cluster system with a unified interface interaction server 11 for digital/electronic currency services, and remove the e-mail management server 3 in the remittance mail management server cluster 10 in the cross-platform remittance mail cluster system to form a remittance management server cluster 12, so as to realize an independent remittance cluster system, as shown in FIG. 11, wherein the remittance management server cluster 12 only includes remittance management server, user authentication server and fund management server.

Whether the value transfer cluster system provided by this embodiment is implemented by a cross-platform remittance mail cluster system or an independent remittance cluster system, the cluster system can be implemented by one of the following architectures.

1) Use a complete architecture, which includes remittance management server, user authentication server, fund management server, digital/electronic currency interaction server, unified interface interaction server for digital/electronic currency service and, database, and set the corresponding domain name and IP in the DNS server. The fund management server in each new system can set the corresponding domain name and IP address through the DNS system. This architecture is suitable for users who need to build their own systems or to integrate this system into their own systems. Because the servers are independent, the value transfer between different domain names needs to go through digital/electronic currency network.

2) Reuse the existing digital/electronic currency server in the same server side, but add new remittance management server, user authentication server, fund management server, unified interface interaction server for digital/electronic currency services and, database, etc. Add a new domain name and IP to the server in order to point to the newly added remittance management server, thus forming a cluster system. The newly added database can run on the same database server or on different database servers. This architecture does not need to build a new complete remittance management system, thus saves the waste of redundant equipment and resources caused by synchronizing digital currency nodes, and greatly reduces costs, so it is suitable for system custodians or cloud service providers. For example, the current Bitcoin full node is about 300G, and a server with 4 cores and 8G and a large-capacity SSD needs to run for about 5-10 days to complete synchronization when the bandwidth is about 5M and the network condition is good, whether it is computing, storage, bandwidth, traffic or time, the consuming is enormous. By eliminating this consumption, the release efficiency of the new system can be greatly improved, and the cost can be significantly reduced. It is only necessary to add or remove corresponding fund management servers and databases simply and flexibly. Since the digital/electronic currency server is shared by multiple fund management servers, its maintenance can be performed by one of the fund management servers independently. Within the same cluster system, since domain names belong to different clusters, the value transfer between different domain name addresses can be accomplished either through digital/electronic currency networks or through internal database updates. To systems in different clusters, the value transfer between domain addresses needs to pass through the digital/electronic currency network.

3) Do not add a new server, but only realize operations such as inquiry and update of new domain names and addresses, etc., through database fields. This architecture does not need to add or remove servers, so it has high economic benefits. However, since the operations for multiple domain names are not physically independent, but by sharing the same database table and the separation is realized through internal virtualization technology, the security is comparatively low, and it is easy to cause confusion in management. In addition, the co-table processing of multi-domain-name records is likely to reduce the efficiency of the database and increase the possibility of errors (such as deadlocks, etc.). Since multiple domain names share the same IP address of the remittance management server, if the remittance management server fails unexpectedly due to one domain address, it will affect other domain addresses, resulting in a greater negative impact. Within this system, value transfer between different domain names can be accomplished either through digital/electronic currency networks or through internal database updates. If the domain address does not belong to this system, the value transfer between them needs to go through the digital/electronic currency network.

4) A hybrid of the above architectures. For domain names and e-mail addresses that are in small scale or those who can be hosted by a cloud service provider, it can be implemented through Architecture 2 and/or Architecture 3. For domain names and e-mail addresses that are in medium/large-scale, or those who need to be managed by independent digital/electronic currency server, it can be implemented through Architecture 1. Architecture 2 and Architecture 3 can also be in the same cluster system, that is, some remittance management servers correspond to their unique domain name, while some remittance management servers can correspond to multiple domain names.

Further, in order to improve the efficiency of fund transmission and reduce the cost, it is possible to transfer funds between the fund management servers that belong to the same cluster system and share the same digital/electronic currency interaction server (that is, running the digital currency wallet program or the digital/electronic currency external interaction program) using internal transfers instead of external. When the fund management server receives/remits through the unified interface server, it first confirms whether the servers of the sending and receiving parties are in the same cluster system. If so, the internal transfer will be realized by means of database updates, etc., if not, it will be carried out using external transfers through digital currency or digital/electronic currency network.

In order to verify whether different fund management servers belong to the same cluster system, internal identifiers, public/private key signature verification or wallet address signature verification, etc. can be used. For example, a specific string can be used for fund management servers belonging to the same cluster system for internal identification, such as "abcd1234". When the sender and the receiver confirm the identifier, they can consider that the other party belongs to the same cluster system, and then process accordingly. Alternatively, since both fund management servers can access the same digital/electronic currency interaction server, it is possible to verify whether both parties belong to the same cluster system through address signature or other methods. Alternatively, add an extra management server and connect it to all fund management servers in the same cluster system. The fund management servers of the sending and receiving parties recognize the cluster system to which both parties belong by accessing this management server.

The value transfer cluster system provided by this embodiment is flexible and diverse. For example, a cross-platform remittance mail cluster system can be used for value transfer, or an independent remittance cluster system can be used for value transfer. No matter which cluster system is, it can use any of the above-mentioned cluster architectures to process unified payment receiving address and multiple payment receiving addresses, so that the addition and removal of multi-domain e-mail addresses is safe, flexible, and cost-effective.

The foregoing uses particular examples to explain the present invention and is only to help in understanding the present invention and are not limiting of the present invention. For those skilled in the art to which the present invention belongs, according to the idea of the present invention, several simple deductions, modifications or substitutions can also be made.

What is claimed is:

1. An email-based value transfer method, comprising:
   establishing an Internet Protocol connection between a remitter's e-mail server and a remittee's e-mail server, wherein the remitter's email server is bound to a first domain name and the remittee's email server is bound to a second domain name, wherein the first domain name and the second domain name are managed independently from each other;
   obtaining a payment receiving address of the remittee based on interactive operations between the remitter's e-mail server and the remittee's e-mail server comprising:
      based on the establishing, automatically utilizing a fund inquiry function configured in the remittee's e-mail server to query the payment receiving address corresponding to an e-mail address of the remittee; and
   performing a remittance operation via the Internet Protocol connection according to the payment receiving address from the remitter's e-mail server to the remittee's e-mail server;
   wherein the payment receiving address is a currency address corresponding to a target e-mail address.

2. The email-based value transfer method according to claim 1, wherein the querying the payment receiving address comprises querying a mail exchange field.

3. The email-based value transfer method according to claim 1, wherein obtaining the payment receiving address of the remittee includes, based on the Simple Mail Transfer Protocol supporting remittance instructions configured in the e-mail interaction servers, querying the payment receiving address.

4. The email-based value transfer method according to claim 1, wherein if the payment receiving address is the unified interface address, the remittance operation further comprises sending remittance information to the remittee.

5. The email-based value transfer method according to claim 1, wherein the step of obtaining the payment receiving address of the remittee includes, based on a fund inquiry function configured in the e-mail interaction servers, querying the payment receiving address corresponding to the remittee's e-mail domain name configured in a Domain Name System server.

6. The email-based value transfer method of claim 1, wherein the Internet Protocol connection between the remitter's e-mail server and the remittee's e-mail server is a direct connection.

7. The email-based value transfer method of claim 1, wherein the payment receiving address is selected from the group consisting of: a unified interface address, a digital currency address, and an electronic currency address.

8. An email-based value transfer cluster system, comprising:
- email client, a plurality of remittance mail management server clusters, each remittance mail management server cluster is configured with a corresponding e-mail interaction server respectively;
- wherein the plurality of remittance mail management server clusters is interactively connected to the e-mail client and the corresponding e-mail interaction server respectively;
- wherein a remittance mail management server is used to receive e-mail sending request information from the e-mail client and, when the e-mail sending request information contains remittance information, the remittance mail management server further sends the remittance information to the corresponding e-mail interaction server;
- wherein the corresponding e-mail interaction server is used to send or receive e-mails and, is also used to obtain the payment receiving address according to the remittance information and, feedback the payment receiving address to the remittance mail management server clusters; and
- wherein the remittance mail management server clusters are further configured to perform a remittance operation via a connection between the remittance mail management server cluster and the corresponding e-mail interaction server according to the payment receiving address.

9. The email-based value transfer cluster system according to claim 8, wherein the corresponding e-mail interaction server is provided with a fund inquiry module, and the fund inquiry module is used to query the payment receiving address corresponding to an e-mail address of the remittee, or to query the payment receiving address corresponding to an e-mail domain name of the remittee configured in a Domain Name System server.

10. The email-based value transfer cluster system according to claim 8, wherein the corresponding e-mail interaction server queries the payment receiving address based on a configured Simple Mail Transfer Protocol supporting remittance instructions.

11. The email-based value transfer cluster system according to claim 8, wherein the payment receiving address is a unified interface address or a digital or electronic currency address corresponding to a target e-mail address.

12. The email-based value transfer cluster system according to claim 8, wherein each remittance mail management server cluster is configured with e-mail domain names, so that each remittance mail management server cluster performs remittance operations according to the e-mail domain names.

13. An email-based value transfer method, comprising: enabling a decentralized financial transaction, comprising:
- establishing a direct Internet Protocol connection between a remitter's e-mail server and a remittee's e-mail server, wherein the remitter's email server is bound to a first domain name and the remittee's email server is bound to a second domain name, wherein the first domain name and the second domain name are managed independently from each other;
- obtaining a payment receiving address of the remittee based on interactive operations between the remitter's e-mail server and the remittee's e-mail server, the interactive operations comprising:
  - based on the establishing, automatically utilizing a fund inquiry function configured in the remittee's e-mail server to query the payment receiving address corresponding to an e-mail address of the remittee; and
- performing a remittance operation via the Internet Protocol connection according to the payment receiving address from the remitter's e-mail server to the remittee's e-mail server, wherein the remittance operation comprises transferring digital currency;
- wherein the payment receiving address is a digital currency address corresponding to a target e-mail address.

14. The email-based value transfer method of claim 13, wherein the querying the payment receiving address comprises querying a mail exchange field.

15. The email-based value transfer method of claim 13, wherein obtaining the payment receiving address of the remittee includes, based on the Simple Mail Transfer Protocol supporting remittance instructions configured in the e-mail interaction servers, querying the payment receiving address.

16. The email-based value transfer method of claim 13, wherein the step of obtaining the payment receiving address of the remittee includes, based on a fund inquiry function configured in the e-mail interaction servers, querying the payment receiving address corresponding to the remittee's e-mail domain name configured in a Domain Name System server.

17. The email-based value transfer method of claim 13, wherein the performing a remittance operation does not utilize a third-party payment system.

18. The email-based value transfer method of claim 13, wherein utilizing the fund inquiry function comprises sending a query via simple mail transfer protocol (SMTP) and receiving the payment receiving address.

19. The email-based value transfer method of claim 18, wherein performing the remittance operation comprises utilizing the transaction identifier.

20. The email-based value transfer method of claim 18, wherein utilizing the fund inquiry function further comprises receiving an internal unique transaction identifier via SMTP protocol.

* * * * *